Jan. 1, 1963 F. O. VONBUN ET AL 3,071,736

HEAT SINKS FOR CRYSTAL OSCILLATORS

Filed April 13, 1961

INVENTORS,
STANLEY S. SCHODOWSKI &
FRIEDRICH O. VONBUN.

BY Jack H. Linscott

ATTORNEY.

United States Patent Office 3,071,736

Patented Jan. 1, 1963

3,071,736

HEAT SINKS FOR CRYSTAL OSCILLATORS

Friedrich O. Vonbun, Hyattsville, Md., and Stanley S. Schodowski, Asbury Park, N.J., assignors to the United States of America as represented by the Secretary of the Army Filed Apr. 13, 1961, Ser. No. 102,902

2 Claims. (Cl. 331—69)

(Granted under Title 35, U.S. Code (1952), sec. 266)

The invention described herein may be manufactured and used by or for the Government for governmental purposes without the payment of any royalty thereon.

The present invention relates to the temperature control of crystal oscillators. More particularly, the invention relates to heat sinks for such oscillators adapted to utilize the very constant temperature of the human body.

Hitherto, various arrangements have been suggested for controlling the temperature of portable crystal oscillators, which have to be operated with a frequency stability better than 50 parts per million, in areas where the temperature may range between −40° C. and +55° C. However, such arrangements have generally involved very complicated ovens or refrigerators, are very costly, are very heavy and cumbersome, require high power capabilities and so are of limited applicability. As far as is known, there is no commercial product avalable which can satisfy the temperature controlling requirements for portable crystal oscillators, capable of maintaining a high degree of frequency stability, in a lightweight design which is as simple and compact as might be desired.

The present invention comprises a heat sink in the form of an enclosure for a small crystal controlled oscillator that is particularly useful for communication equipment to be carried by a soldier in forward areas, in a manner which obviates the need of auxiliary electric, thermoelectric, nuclear or chemical power for heating or cooling. The heat sink consists of a metal plate insulated, from a bonding band of metal, by a ring of insulation fastened to its peripheral edges, and further provided with a metallic cover secured to the meal band to form a space therebetween. The crystal and the oscillator components are counted within the enclosure on the metal plate.

An object of this invention is to provide a heat sink for the temperature control of a crystal oscillator which is of simple and inexpensive construction, and which maintains a crystal closely within desired temperature limits, as controlled by a stable heat source such as the human body.

Figure 1:
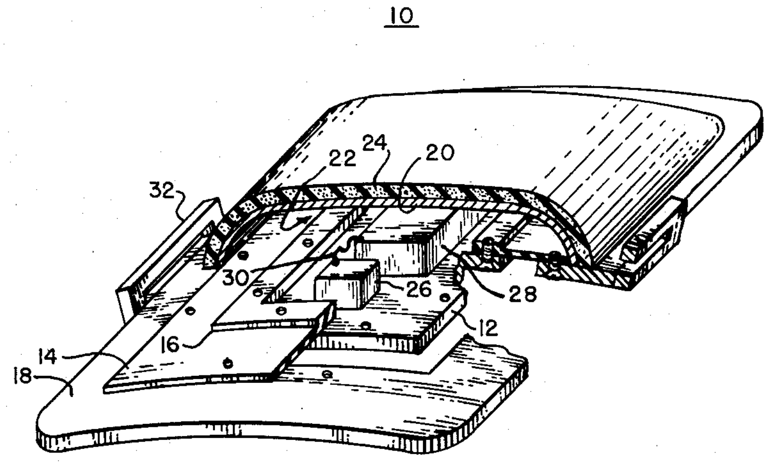
Figure 2:
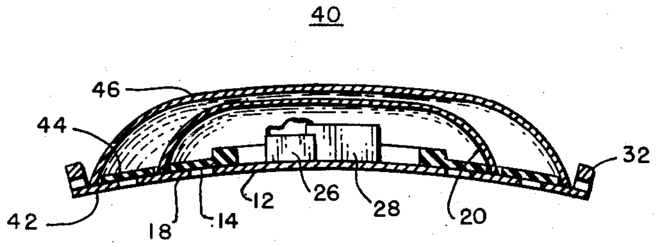

For a more detailed description of the invention, together with other and further objects thereof reference is had to the following description taken in connection with the accompanying drawing in which similar numerals designate similar elements and wherein:

FIG. 1 is a perspective view, in partial cross-section, showing the arrangement of the principal elements of the heat sink in accordance with the present invention; and FIG. 2 is a sectional view of another embodiment of the invention.

In the embodiment of the invention illustrated in FIG. 1, there is shown a heat sink 10 which includes a plate 12 made of heat conducting metal, such as silver plated copper. Metal plate 12 preferably is of a rectangular shape, but may be of any geometrical shape such as square, round or oval, and is bounded on its peripheral edges by a ring or band 14 of insulating material, such as Teflon in abutment therewith. Band 14 is provided with a raised border portion or increased thickness adjacent the edges of plate 12 to form a shoulder 16. In the same fashion, a second band of silver plated copper 18 extends around the peripheral edges of insulating band

14 and is in abutment therewith. A practical method of securing the proximal edges of the co-planar spaced elements 12 and 18 to the connecting insulating band 14 is by a plurality of screws disposed about the inner and outer edges of band 14, substantially as shown. A metal cover or heat shield 20 of silver plated copper, which may be of any suitable shape, such as square, round or oval, is fixed at its rim to the marginal edges of metal band 18. Cover 20 provides a space 22 between its inner surface and the opposing surfaces of elements 12, 14 and 18.

The metal cover 20 may be further heat insulated by a layer of polyfoam 24, or other insulating material, which itself may be protected against moisture by an overlay of rubber base glue or tape. A piezoelectric quartz crystal 26 and conventional associated oscillator circuit elements 28, coupled by lead 30, are mounted on the inner surface of plate 12, within space 22. Crystal 26 and oscillator circuit elements 28 are both electrically and thermally joined to plate 12, and furthermore are thermally isolated within space 22 from outside temperature variations. Heat sink 10 is further provided with loops 32 fixed to opposite marginal portions of band 18 and are employed to engage a belt (not shown) to secure the heat sink to the body of the wearer.

In order to minimize frequency deviation of the crystal oscillator during operation, the angle of cut of crystal 26 is chosen to provide a minimum temperature coefficient when operated at substantially 36° C., which approximates the mean temperature of the heat sink 10 when in direct contact with a human body.

The embodiment depicted in FIG. 2 is similar in structure to the embodiment shown in FIG. 1, except that heat sink 40 in this modification employs an additional metal band 42 encircling band 18 and spaced therefrom. Bands 18 and 42 are interconnected by an insulating band 44 surrounding band 18, as shown. Loops 32, in this instance, are fixed to opposite edges of band 42. For further heat insulation of crystal 26 and components 28, heat sink 40 includes another metal cover or heat shield 46, which completely encases cover 20, and is fixed to metal band 42.

This investigation provides, therefore, heat sinks for the temperature control of crystal oscillators which are of simple and inexpensive construction. It has been found by repeated tests under various climatic conditions, that when the metal plate 12 makes good thermal contact to different parts of the body of a human being, such as the lower part of the chest or the inner part of the thigh, it provides a path of high thermal conductivity to the crystal 26 and oscillator components 28.

Heat sinks 20 or 40 may be easily adapted for encasing crystals of different sizes and shapes, while at the same time they possess a compact form to provide maximum comfort to the wearer. Moreover, while these heat sinks have been described with reference to crystal temperature control equipment, it is equally applicable to other temperature control arrangements or chambers such as those used for maintaining electrical or other elements at a constant temperature. Thus, what is said with respect to crystal temperature control heat sinks applies also to other constant temperature apparatus where similar requirements must be met.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A portable heat sink for attachment to a substantially external constant heat source comprising a heat conducting flat metal plate having a quartz crystal and associated oscillator components mounted on the inner surface thereof, a flat metal band circumscribing said metal plate and being spatially positioned with respect thereto and co-planar therewith, an insulating band interconnecting said metal band and said metal plate, a first metal cover fixed at its rim to the marginal edges of said metal band and extending over said metal plate and the metal band to provide a space for said quartz crystal and oscillator components between the inner surface of said cover and said inner surface of said plate, and means fixed to said metal band for holding the outer surface of said metal plate into contact with said constant heat source whereby the constant temperature of said heat source is utilized to control the temperature of said quartz crystal and associated components.

2. A heat sink as set forth in claim 1, and further including a second metal cover extending over said first metal cover and spaced therefrom, and insulating means interconnecting said first metal cover with said second metal cover at their respective marginal edges.

References Cited in the file of this patent

UNITED STATES PATENTS 1,950,246 Hyland ---------------- Mar. 6, 1934